Patented Mar. 10, 1942

2,276,169

UNITED STATES PATENT OFFICE 2,276,169

POLYAZO DYESTUFFS AND PROCESS FOR THEIR MANUFACTURE

Fritz Dobler and Hans Buess, Basel, Switzerland, assignors to the firm J. R. Geigy A. G., Basel, Switzerland No Drawing. Application February 9, 1940, Serial No. 318,182. In Switzerland February 15, 1939

13 Claims. (Cl. 260—166)

It has been found that the polyazo dyestuffs of the general formula

C—N=N—B—N=N—A—N=N—D wherein A represents 3-hydroxydiphenylamine or one of its twice coupling derivatives, B represents the radical of a diazotized peri-aminonaphtholmono- or disulphonic acid, C and D represent the radicals of two equal or different diazo- or diazoazo compounds which are preferably substituted by nitro groups, and which contain at least two or better three sulphonic acid groups, constitute very valuable brown leather-dyestuffs. They are particularly adapted for dyeing box calf and velour leather, whereon they yield very full and level brown dyeings which distinguish themselves by a good to very good polishing fastness. Some of the dyes give a depth of the shade not previously realisable by homogeneous dyestuffs. The fastness to fat liquor is also good.

The new polyazodyestuffs can be produced according to different methods. For example one can operate in the following sequence:

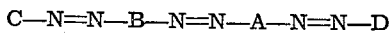

that is one couples a diazotized 1-amino-8-hydroxynaphthalene sulphonic acid (B) with 3-hydroxydiphenylamine or one of its twice coupling derivatives (A) and causes the monoazodyestuff to react with two equal or different diazotized amines or aminoazodyestuffs (C/D).

Another sequence of operations is represented by the scheme

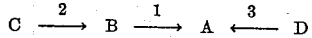

According to this method, one molecule of any diazo- or diazoazo compound (C) is combined in alkaline solution with one molecule of a 1-amino-8-hydroxynaphthalene sulphonic acid (B), the so obtained aminoazo- or aminodisazodyestuff is further diazotized and coupled with one molecule of a 3-hydroxydiphenylamine (A). This dyestuff can be acted upon by a further molecule of a diazo- or diazoazocompound (D) of any kind. The first and last diazo components can be similar to each other or different from each other.

Similar dyestuffs can also be obtained according to the following alternative:

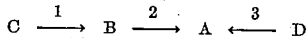

i. e. one molecule of a diazo (azo) compound (D) containing one or more sulphonic acid groups is coupled with one molecule of a 3-hydroxydiphenylamine (A), one molecule of a diazotized 1-amino-8-hydroxynaphthalene sulphonic acid (B) is combined and finally one molecule of any desired diazo compound (C) is caused to react therewith.

Finally it may be noted that it is also possible to combine according to scheme

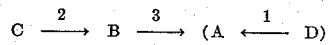

in alkaline solution one molecule of a diazo (azo) compound (C) with one molecule of a 1-amino-8-hydroxynaphthalene sulphonic acid (B) and then the diazo compound of this mono- or disazodyestuff with one molecule of a mono- or disazodyestuff which can be obtained by coupling one molecule of a diazo-(azo) compound (D) with one molecule of a 3-hydroxydiphenylamine (A).

In all cases it is important that the monoazodyestuffs which are produced as intermediate products contain at least one sulphonic acid group.

The following examples illustrate the invention, the parts being by weight.

Example 1

319 parts of 1-amino-8-hydroxynaphthalene-3:6-disulphonic acid are diazotized in the usual manner. The diazo compound is added within 30 minutes to an ice-cooled solution at 0° C. of 185 parts of 3-hydroxydiphenylamine in 5000 parts of water, 40 parts of sodium hydroxide and 150 parts of anhydrous sodium carbonate. After the coupling is completed, an aqueous solution of 250 parts of sodium carbonate is added to the solution of the monoazodyestuff and thereupon the diazo body prepared from 173 parts of 1-aminobenzene-4-sulphonic acid is added within 5 minutes at 0° C. When no more diazo compound is detectable, there is introduced within 5 minutes into the solution of the disazodyestuff kept alkaline by means of sodium carbonate a diazo solution prepared from 138 parts of 1-amino-4-nitrobenzene. The formation of the trisazodyestuff is very rapidly completed. To precipitate the dyestuff, the solution is acidified with hydrochloric acid up to Congo-acid reaction and then 10 per cent of common salt calculated on the volume are added. The precipitated dyestuff is filtered and dried.

The dyestuff constitutes in dry state a black powder which dissolves very easily in water with dark-brown coloration and in concentrated sulphuric acid with dark green coloration.

Chrome-tanned leather is dyed with the dyestuff from acid bath full, dark-brown shades. The dyeing on velour leather distinguishes itself by a remarkable fastness to polishing. The dyestuff can also be used for dyeing vegetable-tanned leather.

If in the above example the 3-hydroxydiphenylamine is replaced by the equivalent quantity of 3-hydroxy-2'-methyl-diphenylamine or 3-hydroxy-3'-methyl-diphenylamine or 3-hydroxy-4'-methyl-diphenylamine, likewise valuable dyestuffs of very similar properties are obtained.

*Example 2*

The diazo compound prepared from 319 parts of 1-amino-8-hydroxynaphthalene-3:6-disulphonic acid in the usual manner is introduced within 30 minutes into a solution, cooled by ice to 0° C., of 199 parts of 3-hydroxy-2'-methyl-diphenylamine in 5000 parts of water, 40 parts of sodium hydroxide and 150 parts of anhydrous sodium carbonate. After the coupling is completed, a diazo solution prepared from 138 parts of 1-amino-4-nitrobenzene is poured in within 5 minutes at 0° C. The coupling mixture must always react alkaline against litmus. As soon as the coupling is finished, the disazodyestuff is intermixed with a solution of 250 parts of anhydrous sodium carbonate, and the diazo compound prepared from 309 parts of 4'-amino-4-nitrodiphenylamine-2-sulphonic acid is introduced thereinto within 30 minutes. The diazo compound disappears completely after a short time. The dyestuff is precipitated from its aqueous solution by addition of hydrochloric acid up to Congo-acid reaction and of common salt, filtered and dried. It constitutes in dry state a black powder, which is very easily soluble in water with dark-brown coloration and in concentrated sulphuric acid with violet-black coloration.

The dyestuff dyes chrome-tanned leather still darker, somewhat redder shades than the product of Example 1. The other properties are equally good.

If in the above example the 4'-amino-4-nitrodiphenylamine-2-sulphonic acid is replaced by an equivalent quantity of 1-amino-4-nitrobenzene or by equivalent quantities of the aminoazodyestuffs from 1-amino-4-nitrobenzene and aminonaphthalenesulphonic acid Cleve (technical mixture of the 1:6- and 1:7-isomers) or from 4'-amino-4-nitro-diphenylamine-2-sulphonic acid and aminonaphthalene sulphonic acid Cleve, dyestuffs of similar good properties are obtained.

If in the above example the 1-amino-4-nitrobenzene is replaced by the equivalent quantity of 1-amino-4-nitrobenzene-2-sulphonic acid, a dyestuff is obtained which dyes leather substantially redder shades with the same excellent properties.

*Example 3*

319 parts of 1-amino-8-hydroxynaphthalene-3:6-disulphonic acid are diazotized in the usual manner and the diazo compound is coupled with 199 parts of 3-hydroxy-2'-methyl-diphenylamine in the same way as indicated in Example 2. The solution of the monoazodyestuff is intermixed with 250 parts of sodium carbonate; then the diazo body prepared from 173 parts of 1-aminobenzene-4-sulphonic acid is added within 5 minutes at 0° C. The thus obtained solution of the disazodyestuff is caused to react with a diazo compound prepared from 223 parts of 1-aminonaphthalene-4-sulphonic acid. The coupling mixture must react alkaline against litmus. After the coupling is finished, the trisazodyestuff is precipitated in the usual manner by addition of hydrochloric acid and common salt, filtered and dried. It constitutes a black powder which dissolves very easily in water with dark-brown coloration and in concentrated sulphuric acid with green-black coloration.

The dyestuff dyes chrome-tanned velour-leather reddish, dark-brown shades of very good fastness to polishing. It can also be used for the dyeing of box-calf and of vegetable-tanned leather.

If in the above example the 1-aminonaphthalene-4-sulphonic acid is replaced by equivalent quantities of the aminoazodyestuffs from 1-aminobenzene-4-sulphonic acid and aminonaphthalenesulphonic acid Cleve (technical mixture of the 1:6- and 1:7-isomers) or from 1-aminonaphthalene-4-sulphonic acid and aminonaphthalenesulphonic acid Cleve or from 1-amino-4-nitrobenzene and aminonaphthalenesulphonic acid Cleve, dyestuffs are obtained which differ from the above referred to by the still darker shade of their dyeings. The other properties are of the same value as those of the product of the above example.

*Example 4*

138 parts of 1-amino-4-nitrobenzene are diazotized in the usual manner. The diazo solution is coupled with a neutralized and furthermore with 250 parts of sodium carbonate intermixed solution of 319 parts of 1-amino-8-hydroxynaphthalene-3:6-disulphonic acid. After the coupling the aminoazo-dyestuff is precipitated in the usual manner, the filter-cake dispersed in water and diazotized by addition of sodium nitrite and hydrochloric acid. The diazoazo body is introduced within 5 minutes into an aqueous solution of 199 parts of 3-hydroxy-2'-methyl-diphenylamine, 40 parts of sodium hydroxide and 200 parts of anhydrous sodium carbonate. After the coupling is completed, the diazo body prepared from 309 parts of 4'-amino-4-nitrodiphenylamine-2-sulphonic acid is introduced within 30 minutes into the disazodyestuff. By simultaneous addition of sodium carbonate the reaction of the coupling solution is kept alkaline to litmus. The diazo body disappears after a short time. At the end of the coupling the dyestuff is precipitated by addition of common salt, filtered and dried. It constitutes a black powder which dissolves in water very easily with dark-brown coloration and in concentrated sulphuric acid with violet-black coloration.

The dyestuff dyes chrome-tanned leather very beautiful, reddish, dark-brown shades. The dyeings on velour leather show a great fastness to polishing. It can also be used for dyeing vegetable-tanned leather.

If in the above example the 1-amino-4-nitrobenzene is replaced by the equivalent quantity of 1-aminobenzene-4-sulphonic acid, a dyestuff is obtained which has similar good properties. If the 1-amino-4-nitrobenzene is replaced by the equivalent quantity of 4'-amino-4-nitrodiphenylamine-2-sulphonic acid, a dyestuff is obtained which dyes leather greenish, dark-brown shades of excellent properties.

If in the above example the 4'-amino-4-nitrodiphenylamine-2-sulphonic acid is replaced by an equivalent quantity of the aminoazodyestuff from 4'-amino-4-nitro-diphenylamine-2-sulphonic acid and aminonaphthalene-sulphonic acid Cleve (technical mixture of the 1:6- and 1:7-isomers), a dyestuff is obtained which dyes leather still darker shades of equally good properties.

*Example 5*

173 parts of 1-amino-benzene-4-sulphonic acid are diazotized in the usual manner. The diazo compound is added within 5 minutes to an aqueous solution, cooled by ice to 0° C., of 199 parts of 3-hydroxy-2'-methyl-diphenyl-amine, 40 parts of sodium hydroxide and 150 parts of anhydrous sodium carbonate. The coupling being completed, the solution of the monoazodyestuff kept alkaline by means of sodium carbonate is mixed within 30 minutes at 0° C. with the diazo compound prepared in the usual manner from 329 parts of 1-amino-8-hydroxynaphthalene-3:6-disulphonic acid. Finally there is added to the solution of the thus obtained disazodyestuff, kept alkaline with sodium carbonate, within 5 minutes a diazo solution prepared from 138 parts of 1-amino-4-nitrobenzene. The trisazodyestuff thus obtained is precipitated from the aqueous solution by addition of hydrochloric acid up to Congo-acid reaction and of common salt, filtered and dried.

The dyestuff constitutes a black powder which dissolves very easily in water with brown, in concentrated sulphuric acid with dark-brown coloration. It dyes leather of any tanning preparation beautiful, reddish, middle-brown shades. The dyeings on velour-leather are remarkable by their very good fastness to polishing.

If in the above example the 1-amino-8-hydroxy-naphthalene-3:6-disulphonic acid is replaced by the equivalent quantity of 1-amino-8-hydroxynaphthalene-4:6-disulphonic acid or 1-amino-8-hydroxynaphthalene-2:4-disulphonic acid, dyestuffs of very similar properties are obtained.

If in the above example the 1-amino-4-nitrobenzene is replaced by the equivalent quantity of 4'-amino-4-nitro-diphenylamine-2-sulphonic acid, a dyestuff of similar properties is obtained.

*Example 6*

223 parts of 1-aminonaphthalene-4-sulphonic acid are diazotized and coupled at 0° C. with an aqueous solution of 199 parts of 3-hydroxy-2'-methyl-diphenylamine, 40 parts of sodium hydroxide and 150 parts of anhydrous sodium carbonate. The solution of the monoazodyestuff kept alkaline by addition of a further quantity of sodium carbonate is caused to react at 0° C. with the diazo body prepared by diazotization of the aminoazodyestuff produced in alkaline solution from 309 parts of diazotized 4-amino-4'-nitro-diphenylamine-2'-sulphonic acid and 319 parts of 1-amino-8-hydroxynapthalene-3:6-disulphonic acid. The obtained trisazodyestuff is precipitated from the aqueous solution by addition of hydrochloric acid up to Congo-acid reaction and of 25 per cent of common salt (calculated on the volume of the solution), filtered and dried.

The dyestuff constitutes a dark powder, which dissolves very easily in water with dark-brown, in concentrated sulphuric acid with dark-blue coloration.

Chrome-tanned or vegetable-tanned leather is dyed in beautiful, dark-brown shades. The dyeings on velour-leather show a very good fastness to polishing.

If in the above example the 1-aminonaphthalene-4-sulphonic acid is replaced by an equivalent quantity of 1-amino-benzene-4-sulphonic acid, a dyestuff is obtained, which dyes leather in lighter shades. If the 4-amino-4'-nitro-diphenylamine-2'-sulphonic acid is replaced by an equivalent quantity of 1-amino-4-nitro-benzene, a dyestuff is obtained, which dyes leather in somewhat yellower shades of equally good properties.

Besides the 3-hydroxydiphenylamines used in the preceding examples, there may also be used their halogen substitution products such as for example 2'- or 4'-chloro-3-hydroxydiphenylamine etc. and derivatives which have alkoxy groups in the not coupling nucleus, such as for example 2'- or 4'-methoxy- or -ethoxy-3-hydroxydiphenylamine. As 1-amino-8-hydroxynaphthalene sulphonic acids there may also be used the so-called S-acid and others.

What we claim is:

1. A process for the manufacture of brown polyazo dyestuffs, comprising coupling one molecule of a diazotized 1-amino-8-hydroxynapthalene-sulphonic acid having at most two sulphonic acid groups with one molecule of a 3-hydroxydiphenylamine and causing the monoazodyestuff to react with two molecules of two members of the group consisting of diazo- and diazoazo compounds of the benzene and naphthalene series.

2. A process for the manufacture of brown polyazo dyestuffs, comprising coupling one molecule of a diazotized 1-amino-8-hydroxynapththalene-sulphonic acid having at most two sulphonic acid groups with one molecule of a 3-hydroxy-diphenylamine and causing the monoazodyestuff to react with two molecules of two different members of the group consisting of diazo- and diazoazo compounds of the benzene and naphthalene.

3. A process for the manufacture of brown polyazo dyestuffs comprising coupling one molecule of a member of the group consisting of diazo- and diazoazo compounds with one molecule of a 3-hydroxydiphenylamine, combining therewith one molecule of a diazotized 1-amino-8-hydroxynaphthalene sulphonic acid having at most two sulphonic acid groups and causing finally the dyestuff thus obtained to react with one molecule of a member of the group consisting of diazo- and diazoazo compounds of the benzene and naphthalene series.

4. A process for the manufacture of a brown trisazo-dyestuff, comprising diazotizing 1-amino-8-hydroxynaphthalene-3:6-disulphonic acid, coupling the diazo body with 3-hydroxydiphenylamine, combining the monoazodyestuff thus obtained with diazotized 1-aminobenzene-4-sulphonic acid, adding to the alkaline solution of the disazodyestuff thus formed a diazo solution from 1-amino-4-nitrobenzene and precipitating the final dyestuff.

5. A process for the manufacture of a brown trisazo dyestuff, comprising diazotizing 1-amino-benzene-4-sulphonic acid, adding the obtained diazo compound to a solution of 3-hydroxy-2'-methyl-diphenylamine, coupling the obtained monoazodyestuff in alkaline solution with diazotized 1-amino-8-hydroxynaphthalene-3:6-disulphonic acid, combining the thus obtained disazodyestuff with a diazo solution from 1-amino-4-nitrobenezene and precipitating the final dyestuff.

6. A process for the manufacture of a brown tetrakisazo dyestuff, comprising diazotizing 1-amino-8-hydroxynaphthalene-3:6-disulphonic acid, coupling the obtained diazo body with 3-hydroxy-2'-methyl-diphenylamine, combining the monoazodyestuff thus obtained in alkaline medium with diazotized 1-aminobenzene-4-sulphonic acid, causing the disazodyestuff thus obtained to react in alkaline medium with the diazotised monoazodyestuff from 1-amino-4-nitrobenzene, diazotised and coupled with aminonaphthalene sulphonic acid Cleve (technical mixture) and precipitating the final dyestuff.

7. Polyazo dyestuffs for dyeing leather of brown shades of good fastness, having the general formula

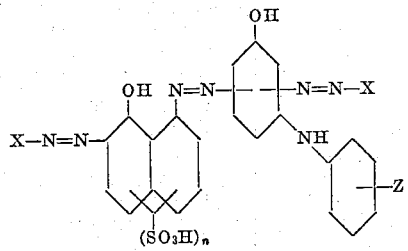

wherein the two X's mean two radicals of the group consisting of aromatic radicals of the benzene and naphthalene series, Z means at least one substituent selected from the group consisting of H, O.alkyl, CH3 and Cl, and $n$ means an integer of the group consisting of 1 and 2, these dyestuffs possessing at least two sulphonic acid groups in the radicals X and in the naphthalene radical.

8. Polyazo dyestuffs for dyeing leather of brown shades of good fastness, having the general formula

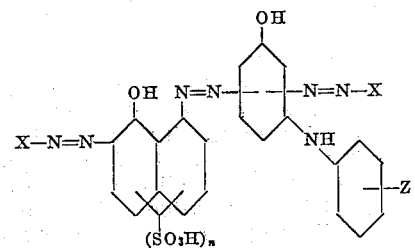

wherein the two X's mean two different radicals of the group consisting of aromatic radicals of the benzene and naphthalene series, Z means at least one substituent selected from the group consisting of H, O.alkyl, CH3 and Cl, and $n$ means an integer of the group consisting of 1 and 2, these dyestuffs possessing at least two sulphonic acid groups in the radicals X and in the naphthalene radical.

9. The polyazo dyestuff as obtained according to the process of claim 4.

10. The polyazodyestuff as obtained according to the process of claim 5.

11. The polyazo dyestuff as obtained according to the process of claim 6.

12. The brown dyeings on leather with the polyazodyestuffs claimed in claim 7.

13. The brown dyeings on leather with the polyazodyestuffs claimed in claim 8.

FRITZ DOBLER.
HANS BUESS.